United States Patent [19]
Lally et al.

[11] Patent Number: 6,149,842
[45] Date of Patent: Nov. 21, 2000

[54] METHODS AND COMPOSITIONS FOR MANUFACTURING TINTED OPHTHALMIC LENSES

[75] Inventors: John Martin Lally, Lilburn, Ga.; Friedrich Stockinger, Courtepin, Switzerland; Charlotte Lynn Cooper, Chamblee, Ga.; Achim Müller, Aschaffenburg, Germany; Deborah Jean Mulcahy, Duluth, Ga.; Bernhard Seiferling, Goldbach, Germany

[73] Assignee: Novartis AG, Basel, Switzerland

[21] Appl. No.: 09/191,063

[22] Filed: Nov. 12, 1998

[51] Int. Cl.⁷ ........................................ B29D 11/00
[52] U.S. Cl. ...................... 264/1.36; 264/1.38; 351/159; 351/162
[58] Field of Search .................................... 264/1.1, 1.36, 264/1.38, 2.6; 351/159, 162, 160 H

[56] References Cited

U.S. PATENT DOCUMENTS

| | | |
|---|---|---|
| 3,360,497 | 12/1967 | Jones et al. |
| 4,252,421 | 2/1981 | Foley ........................ 351/162 |
| 4,619,793 | 10/1986 | Lee ............................ 264/2.6 |
| 4,638,025 | 1/1987 | Fuhrman ..................... 524/40 |
| 4,668,240 | 5/1987 | Lesbeck ....................... 8/507 |
| 4,725,133 | 2/1988 | Neefe ........................ 351/162 |
| 5,030,669 | 7/1991 | Hendrickson et al. ......... 523/333 |
| 5,272,010 | 12/1993 | Quinn .................... 425/411.1 |

FOREIGN PATENT DOCUMENTS

| | | |
|---|---|---|
| 2009668 | 2/1990 | Canada . |
| 0 093 944 A2 | 4/1983 | European Pat. Off. . |
| 0319760A2 | 11/1988 | European Pat. Off. . |
| 0382005A2 | 1/1990 | European Pat. Off. . |
| 0726474 | 2/1996 | European Pat. Off. . |
| S62-265357 | 11/1987 | Japan . |
| 6-258605 | 9/1994 | Japan . |
| 6-286009 | 10/1994 | Japan . |
| 6-347728 | 12/1994 | Japan . |
| 8-179245 | 12/1994 | Japan . |
| WO8504679 | 10/1985 | WIPO . |
| WO 97/17818 | 5/1997 | WIPO . |
| WO 98/05690 | 2/1998 | WIPO . |
| WO 99/02574 | 1/1999 | WIPO . |

*Primary Examiner*—Mathieu D. Vargot
*Attorney, Agent, or Firm*—R. Scott Meece; Robert J. Gorman, Jr.

[57] ABSTRACT

The invention relates to a process for the manufacture of tinted ophthalmic moldings comprising the steps of (a) providing a water soluble polymer precursor having crosslinkable or polymerizable groups;

(b) providing a pigment dispersion comprising an inorganic or organic pigment and a dispersing agent;

(c) mixing the metal phthalocyanine dye or pigment with the polymer precursor to form a tinted prepolymerization mixture, (d) dispensing the tinted prepolymerization mixture into a mold, (e) applying radiation to the tinted prepolymerization mixture in the mold, thereby crosslinking or polymerizing the polymer precursor and entrapping the dye or pigment within the polymeric network of the resultant ophthalmic molding, and (f) opening the mold so that the ophthalmic molding can be removed from the mold.

According to the process, tinted ophthalmic moldings, particularly full-body tinted soft contact lenses having improved properties, are prepared with an improved efficiency.

23 Claims, No Drawings

METHODS AND COMPOSITIONS FOR MANUFACTURING TINTED OPHTHALMIC LENSES

This invention relates broadly to incorporating radiation-absorbing additives into polymeric articles. In a preferred embodiment, this invention relates to compositions and methods of manufacturing visibility ("full body") tinted contact lenses comprising pigments that are strongly resistant to inactivation during photopolymerization or photocrosslinking.

A number of dyes have been incorporated into ophthalmic lenses, such as contact lenses, for a variety of reasons. Two popular types of dyes include ultraviolet (UV) light-absorbing agents and visible light absorbing agents. One common reason for incorporating dyes into contact lenses is to produce a lens which changes the apparent or perceived color of the wearer's iris. Another reason for dying a contact lens is to enable the consumer to easily locate the lens in a clear solution within a lens storage, disinfecting or cleaning container. Dyeing a lens for this purpose is termed "visibility tinting" the lens.

Visibility tinting may be accomplished by applying a dye to a portion of the surface, or by applying the dye to the full front surface of the lens. Alternatively, the tint may be incorporated into the full body of the polymer matrix of the lens. There have been a number of patents and published patent applications relating to tinting contact lenses or manufacturing contact lenses which change the wearer's iris color. However, the known processes are not yet totally satisfactory for example with respect to the production efficiency and/or the quality of the products obtained.

Therefore, there is still a need for a method of making a visibility tinted, i.e., full-body tinted, contact lens with an improved efficiency by for example minimizing in-line production steps. In addition, there is a demand for tinted ophthalmic lenses with improved properties, for example with respect to bleach-resistance, mechanical strength and leaching or migration of the dye out of the lens.

SUMMARY OF THE INVENTION

An object of the invention is to provide a method of tinting an ophthalmic lens in an efficiency manner which minimizes in-line production steps.

Another object of the invention is to provide a method of incorporating a dye into an ophthalmic lens which minimizes subsequent leaching or migration of the dye from the lens.

A further object of the invention is to provide a method of tinting an ophthalmic lens which does not require a dye activation step during the in-line lens production process.

Yet another object of the invention is to provide a method of manufacturing a tinted ophthalmic lens which does not require an extraction step after lens formation.

Still another object of the invention is to provide a method of manufacturing a tinted ophthalmic lens in which the dye is resistant to bleaching during the irradiation (crosslinking and/or polymerizing).

Yet a further object of the invention is to produce a tinted ophthalmic lens which has a higher mechanical strength than a similar lens having no dye therein.

Another object of the invention is to provide a process for uniformly dispersing a dye in a polymer precursor solution to produce a full-body visibility tinted ophthalmic lens without the need for a surfactant. These and other objects and advantages are achieved by the present invention, a summary of which follows.

One embodiment of the invention is a method of producing a full-body tinted contact lens. The method involves mixing a polymeric precursor with a metal phthalocyanate dye, dispensing the mixture into a contact lens mold, and irradiating the mixture, thereby crosslinking and/or polymerizing the polymeric precursor to form a solid tinted lens with dye uniformly dispersed and entrapped therein. A preferred process is a continuous production process for producing visibility tinted contact lenses which does not require or include an in-line extraction step, and in which the dye is not subject to bleaching during irradiation.

Another embodiment of the invention is a visibility tinted ophthalmic lens which is formed by crosslinking and/or polymerizing a polymer precursor in a solution including metal phthalocyanine. A preferred ophthalmic lens is a visibility tinted contact lens formed from an aqueous solution of a vinyl-functional poly(vinyl alcohol) and copper phthalocyanine dye. A preferred tinted lens has improved mechanical strength as compared to a clear lens formed from the same polymer.

DESCRIPTION OF THE PREFERRED EMBODIMENTS

One embodiment of the present invention relates to a process for the manufacture of a radiation-absorbing ophthalmic molding comprising the steps of:

(a) providing a water soluble polymer precursor having crosslinkable or polymerizable groups;

(b) providing a pigment dispersion comprising an inorganic or organic pigment and a dispersing agent;

(c) mixing the pigment dispersion with the polymer precursor to form a tinted prepolymerization mixture, (d) dispensing the tinted prepolymerization mixture into a mold, (e) applying radiation to the tinted prepolymerization mixture in the mold, thereby crosslinking or polymerizing the polymer precursor and entrapping the dye or pigment within the polymeric network of the resultant ophthalmic molding, and (f) opening the mold so that the ophthalmic molding can be removed from the mold.

The terms "polymer precursor" and "prepolymer", as used herein, refer to a crosslinkable or polymerizable material. Preferably, the polymer precursor is vinyl functional, i.e., the polymer precursor includes one or more carbon-carbon double bonds.

(I) POLYMER PRECURSOR

In one preferred embodiment, the polymer precursor has a weight average molecular weight of at least about 2000. In another embodiment, the polymer precursor has a weight average molecular weight of about 10,000 to about 300,000 and preferably from about 10,000 to about 200,000. Even more preferred, the polymer precursor has a weight average molecular weight of about 50,000 to about 100,000.

In accordance with the invention, the polymer precursor is soluble in water. The criterion that the polymer is soluble in water denotes in particular that the polymer precursor is soluble in a concentration of approximately from 3 to 90% by weight, preferably approximately from 5 to 60% by weight, especially approximately from 10 to 60% by weight, in a substantially aqueous solution. Insofar as it is possible in an individual case, polymer precursor concentrations of more than 90% are also included in accordance with the invention.

The prepolymer used in accordance with the invention includes polymerizable or crosslinkable groups, preferably crosslinkable groups. "Crosslinkable groups" denotes customary crosslinkable groups well-known to the person skilled in the art, such as, for example, photocrosslinkable or thermally crosslinkable groups. Crosslinkable groups such as those already proposed for the preparation of contact lens materials are especially suitable. Those include especially, but not exclusively, groups comprising carbon-carbon double bonds. To demonstrate the large variety of suitable crosslinkable groups, there are mentioned here, merely by way of example, the following crosslinking mechanisms: radical polymerization, 2+2 cyclo-addition, Diels-Alder reaction, ROMP (Ring Opening Metathesis Polymerization), vulcanization, cationic crosslinking and epoxy hardening.

The prepolymer used in accordance with the invention preferably comprises crosslinkable groups in an amount of from approximately 0.5 to approximately 80% equivalents, based on the equivalents of monomers that form the polymeric backbone, especially approximately from 1 to 50%, preferably approximately from 1 to 25%, preferably approximately from 2 to 15% and especially preferably approximately from 3 to 10%. Also especially preferred are amounts of crosslinkable groups of from approximately 0.5 to approximately 25% equivalents, especially approximately from 1 to 15% and especially preferably approximately from 2 to 12%, based on the equivalents of monomers that form the polymeric backbone.

One preferred criterion for the suitability of a prepolymer for the process according to the invention is that it is a crosslinkable prepolymer, but the prepolymer is uncrosslinked, or at least substantially uncrosslinked.

In addition, the prepolymer is advantageously stable in the uncrosslinked state, so that it can be subjected to purification. The prepolymers are preferably used in form of a pure solution in the process according to the invention. The prepolymers can be converted into the form of a pure solution by conventional methods, for example in the manner disclosed hereinafter.

The polymerizable or crosslinkable materials useful in accordance with the present invention include a wide variety materials known in the art. Preferred polymeric materials are those which are biocompatible, especially ophthalmically compatible, and which are transparent. A preferred polymer precursor material is a crosslinkable polyvinyl alcohol. It is also possible, however, to use in the process other water-soluble prepolymers that comprise a polymeric backbone and also crosslinkable groups.

A particularly preferred class of polymeric materials is polyvinyl alcohols, especially those disclosed in U.S. Pat. No. 5,508,317, issued to inventor Beat Müller and originally assigned to Ciba-Geigy Corporation. The disclosure of U.S. Pat. No. 5,508,317 is hereby incorporated by reference. The preferred group of prepolymers of polyvinyl alcohols includes derivatives of polyvinyl alcohol having a weight-average molecular weight of at least about 2000 that, based on the number of hydroxy groups of the polyvinyl alcohol, include from about 0.5% to about 80% of units of formula I:

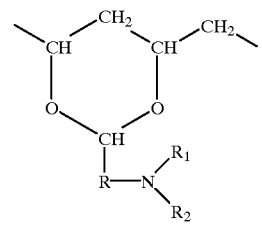

wherein R is lower alkylene having up to 8 carbon atoms, $R_1$ is hydrogen or lower alkyl, and $R_2$ is an olefinically unsaturated, electron-attracting copolymerizable radical, preferably having up to 25 carbon atoms, preferably an olefinically unsaturated acyl radical of the formula $R_3$—CO—, in which $R_3$ is an olefinically unsaturated copolymerizable radical having from 2 to 24 carbon atoms, preferably from 2 to 8 carbon atoms, especially preferably from 2 to 4 carbon atoms.

It should be noted that molecular weights, as used herein, are weight average molecular weights, Mw, unless otherwise specified.

In another embodiment, the radical $R_1$ is a radical of the formula II:

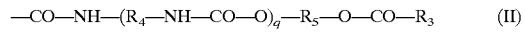

where q is zero or one, $R_4$ and $R_5$ are each independently lower alkylene having from 2 to 8 carbon atoms, arylene having from 6 to 12 carbon atoms, a saturated divalent cycloaliphatic group having from 6 to 10 carbon atoms, arylenealkyene or alkylenearylene having from 7 to 14 carbon atoms or arylenealkyenearlyene having from 13 to 16 carbon atoms, and $R_3$ is as defined above.

A more preferred prepolymer useful in accordance with the present invention is a derivative of a polyvinyl alcohol having a weight average molecular weight of at least about 2000 that, based on the number of hydroxyl groups of the polyvinyl alcohol, includes from about 0.5% to about 80% of units of formula III:

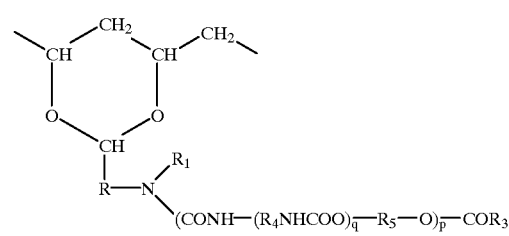

where R is lower alkylene, $R_1$ is hydrogen or lower alkyl, p is zero or one, q is zero or one, $R_3$ is an olefinically unsaturated copolymerizable radical having from 2 to 8 carbon atoms, and $R_4$ and $R_5$ are each, independently of the other, lower allylene having from 2 to 8 carbon atoms, arylene having from 6 to 12 carbon atoms, a saturated divalent cycloaliphatic group having from 7 to 14 or arylenealkylenearylene having from 13 to 16 carbon atoms.

Lower alkylene R preferably has up to 8 carbon atoms and may be straight-chained or branched. Suitable examples include octylene, hexylene, pentylene, butylene, propylene, ethylene, methylene, 2-propylene, 2-butylene and 3-pentylene. Preferably lower alkylene R has up to 6 and especially preferably up to 4 carbon atoms. The meanings methylene and butylene are especially preferred.

$R_1$ is preferably hydrogen or lower alkyl having up to seven, especially up to four, carbon atoms, especially hydrogen.

Lower alkylene $R_4$ or $R_5$ preferably has from 2 to 6 carbon atoms and is especially straight-chained. Suitable examples include propylene, butylene, hexylene, dimethylethylene and, especially preferably, ethylene.

Arylene $R_4$ or $R_5$ is preferably phenylene that is unsubstituted or is substituted by lower alkyl or lower alkoxy, especially 1,3-phenylene or 1,4-phenylene or methyl-1,4-phenylene.

A saturated divalent cycloaliphatic group $R_4$ or $R_5$ is preferably cyclohexylene or cyclohexylene-lower alkylene, for example cyclohexylenemethylene, that is unsubstituted or is substituted by one or more methyl groups, such as, for example, trimethylcyclohexylenemethylene, for example the divalent isophorone radical.

The arylene unit of alkylenearylene or arylenealkylene $R_4$ or $R_5$ is preferably phenylene, unsubstituted or substituted by lower alkyl or lower alkoxy, and the alkylene unit thereof is preferably lower alkylene, such as methylene or ethylene, especially methylene. Such radicals $R_4$ or $R_5$ are therefore preferably phenylenemethylene or methylenephenylene.

Aryleneallylenearylene $R_4$ or $R_5$ is preferably phenylene-lower alkylene-phenylene having up to 4 carbon atoms in the alkylene unit, for example phenyleneethylenephenylene.

The radicals $R_4$ and $R_5$ are each, independently of the other, preferably lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene.

As used herein, the term "lower", as used in connection with radicals and compounds, denotes radicals or compounds having up to 7 carbon atoms, preferably up to 4 carbon atoms, unless defined otherwise. Lower alkyl has especially up to 7 carbon atoms, preferably up to 4 carbon atoms, and is, for example, methyl, ethyl, propyl, butyl or tert-butyl. Similarly, lower alkoxy has especially up to 7 carbon atoms, preferably up to 4 carbon atoms, and is, for example, methoxy, ethoxy, propoxy, butoxy or tert-butoxy.

The olefinically unsaturated copolymerizable radical $R_3$ is preferably alkenyl having from 2 to 24 carbon atoms, especially alkenyl having from 2 to 8 carbon atoms and especially preferably alkenyl having from 2 to 4 carbon atoms, for example ethenyl, 2-propenyl, 3-propenyl, 2-butenyl, hexenyl, octenyl or dodecenyl. $R_3$ is preferably ethenyl and 2-propenyl, so that the group —CO—$R_3$ is the acyl radical of acrylic or methacrylic acid.

The divalent group —$R_4$—NH—CO—O— is present when q is one and absent when q is zero.

Prepolymers in which q is zero are preferred.

The divalent group —CO—NH—($R_4$—NH—CO—O)$_q$—$R_5$—O— is present when p is one and absent when p is zero. Prepolymers in which p is zero are preferred.

In prepolymers in which, p is one the index q is preferably zero. Prepolymers in which p is one, the index q is zero and $R_5$ is lower alkylene are especially preferred.

A preferred prepolymer according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is zero and $R_3$ is alkenyl having from 2 to 8 carbon atoms.

A further preferred prepolymer according to the invention is a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is one, q is zero, $R_5$ is lower alkylene having from 2 to 6 carbon atoms and $R_3$ is alkenyl having from 2 to 8 carbon atoms.

Yet a further preferred prepolymer according to the invention is a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is one, q is one, $R_4$ is lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene, $R_5$ is lower alkylene having from 2 to 6 carbon atoms and $R_3$ is alkenyl having from 2 to 8 carbon atoms.

The prepolymers according to the invention are preferably derivatives of polyvinyl alcohol having a molecular weight of at least about 2000 that, based on the number of hydroxy groups of the polyvinyl alcohol, comprises from approximately 0.5 to approximately 80%, especially approximately from 1 to 50%, preferably approximately from 1 to 25%, preferably approximately from 2 to 15% and especially preferably approximately from 3 to 10%, of units of formula III. Prepolymers according to the invention which are provided for the manufacture of contact lenses comprise, based on the number of hydroxy groups of the polyvinyl alcohol, especially from approximately 0.5 to approximately 25%, especially approximately from 1 to 15% and especially preferably approximately from 2 to 12%, of units of formula III.

Polyvinyl alcohols that can be derivatized in accordance with the invention preferably have a weight average molecular weight of at least 10,000. As an upper limit the polyvinyl alcohols may have a molecular weight of up to 1,000,000. Preferably, the polyvinyl alcohols have a molecular weight of up to 300,000, especially up to approximately 100,000 and especially preferably up to approximately 50,000.

Polyvinyl alcohols suitable in accordance with the invention usually have a poly(2-hydroxy)ethylene structure. The polyvinyl alcohols derivatised in accordance with the invention may, however, also comprise hydroxy groups in the form of 1,2-glycols, such as copolymer units of 1,2-dihydroxyethylene, as may be obtained, for example, by the alkaline hydrolysis of vinyl acetate/vinylene carbonate copolymers.

In addition, the polyvinyl alcohols derivatized in accordance with the invention may also comprise small proportions, for example up to 20%, preferably up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol, styrene or similar customarily used comonomers.

Commercially available polyvinyl alcohols may be used, such as, for example, Vinol® 107 produced by Air Products (MW=22,000 to 31,000, 98–98.8% hydrolyzed), Polysciences 4397 (MW=25,000, 98.5% hydrolysed), BF 14 produced by Chan Chun, Elvanol® 90-50 produced by DuPont, UF-120 produced by Unitika, Mowiol® 3-83, 4-88, 10-98 and 20-98 produced by Hoechst. Other manufacturers are, for example, Nippon Gohsei (Gohsenol®, Monsanto (Gelvatol®), Wacker (Polyviol®) and the Japanese manufacturers Kuraray, Denki and Shin-Etsu. The molecular weights referenced herein are weight average weights, Mw, determined by gel permeation chromatography, unless otherwise specified.

As already mentioned, it is also possible to use copolymers of hydrolysed vinyl acetate, which are obtainable, for example, in the form of hydrolysed ethylene/vinyl acetate (EVA), or vinyl chloride/vinyl acetate, N-vinylpyrrolidone/vinyl acetate and maleic acid anhydride/vinyl acetate.

Polyvinyl alcohol is usually prepared by hydrolysis of the corresponding homopolymeric polyvinyl acetate. In a preferred embodiment, the polyvinyl alcohol derivatised in accordance with the invention comprises less than 50% of polyvinyl acetate units, especially less than 20% of polyvinyl acetate units. Preferred amounts of residual acetate units in the polyvinyl alcohol derivatised in accordance with the invention, based on the sum of vinyl alcohol units and acetate units, are approximately from 3 to 20%, preferably approximately from 5 to 16% and especially approximately from 10 to 14%.

In a preferred embodiment, the polymer precursor comprising units of the formula I or III has a weight average molecular weight of at least about 2000. More preferably, the polymer precursor has a weight average molecular weight of from approximately 10,000 to approximately 300,000. A more preferred weight average molecular weight of the polymer precursor mixtures is about 10,000 to about 200,000. Even more preferred is a weight average molecular weight of about 50,000 to about 100,000.

The prepolymers comprising units of formula I or III may be prepared in a manner known per se. A suitable process for the manufacture of said prepolymers is disclosed for example in U.S. Pat. No. 5,508,317.

The prepolymers comprising units of formula I or III can furthermore be purified via a variety of processes which are likewise disclosed for example in U.S. Pat. No. 5,508,317.

According to step (a) of the inventive process, those polymer precursors which are liquid or readily meltable may be provided substantially free of solvents. However, the polymer precursor preferably is in solution with a solvent.

Suitable solvents for the polymer precursor include water, alcohols, such as lower alkanols, for example ethanol or methanol, also carboxylic acid amides, such as dimethylformamide, or dimethyl sulfoxide, and also a mixture of suitable solvents, such as, for example, a mixture of water with an alcohol, such as, for example, a water/ethanol or a water/methanol mixture.

Preferably, the polymer precursor according to step (a) is provided in form of an aqueous solution and more preferably in form of a pure aqueous solution or a solution of an artificial lacrimal fluid.

Especially preferred concentrations of the polymer precursor in solution are from approximately 15 to approximately 50% by weight, especially from approximately 15 to approximately 40% by weight, for example from approximately 20% to approximately 40% by weight.

The aqueous solution of polymer precursor may be a salt solution, especially solutions that have an osmolarity of approximately from 200 to 450 milliosmol per 1000 ml (unit: mOsm/i), preferably an osmolarity of approximately from 250 to 350 mOsm/l, especially approximately 300 mOsm/l, or in mixtures of water or aqueous salt solutions with physiologically tolerable polar organic solvents, such as, for example, glycerol.

The aqueous salt solutions are advantageously solutions of physiologically tolerable salts, such as buffer salts customary in the field of contact lens care, for example phosphate salts, or isotonising agents customary in the field of contact lens care, such as, especially, alkali halides, for example sodium chloride, or solutions of mixtures thereof. An example of an especially suitable salt solution is an artificial, preferably buffered, lacrimal fluid that in respect of pH value and osmolarity is adapted to natural lacrimal fluid, for example a sodium chloride solution that is unbuffered or that is preferably buffered, for example, by phosphate buffer, and that has an osmolarity that corresponds to the osmolarity of human lacrimal fluid.

The substantially aqueous solution of the polymer precursor defined above is preferably a pure solution which means a solution which is free or essentially free from undesired constituents. The viscosity of the solution of the prepolymer in the substantially aqueous solution should be sufficiently low to allow reasonable processability. Thus, the polymer precursor solution viscosity should be sufficiently low to allow dispensing through the chosen dispensing tip into the female mold half at a reasonably fast rate in order to minimize cycle time and in order to minimize product defects (e.g., defects associated with bubble formation).

The polymer precursor or the solution of the polymer precursor according to step (a) is preferably one that comprises no, or substantially no, undesired constituents that would have to be extracted after a crosslinking operation. Undesirable constituents includes monomeric, oligomeric or polymeric starting compounds used for the preparation of the prepolymer. Thus, the concentration of undesirable constituents after crosslinking is an amount which is less than that which would cause ocular irritation or damage after normal use in the ocular environment. A particular feature of this preferred embodiment of the process according to the invention is that extraction of undesired constituents following crosslinking is not necessary.

(II) INORGANIC OR ORGANIC PIGMENT

The class of radiation-absorbing additives useful in accordance with the present invention are inorganic or organic pigments or derivatives thereof. The use of organic pigments, specifically phthalocyanine pigments, more specifically copper phthalocyanine pigments and most specifically blue copper phthalocyanine pigments, for example Color Index Pigment Blue 15, Constitution No. 74160, is preferred.

The amount of pigment necessary in a particular application may vary within wide limits dependent, in part, upon the desired final product dimensions and desired visible and/or ultraviolet light transmission. For example, the amount of pigment is chosen so that the optical transmission of the final lens is for example $\geq 80\%$, preferably $\geq 90\%$, more preferably from 92 to 99.5% and particularly preferably from 95 to 99%. The above given transmission values refer to a 100 mm center thickness of the lens and to the wavelength of the absorption maximum of the respective pigment. The amount of pigment necessary to achieve the desired optical transmission is advantageously chosen so that the weight percentage of pigment, based on the total weight of polymer precursor and optional comonomers present in the prepolymerization mixture according to c), is from about 0.0001 to 0.05%. Preferably, said weight percentage of pigment is from about 0.0001 to 0.02%. More preferably, said weight percentage of pigment is from about 0.0001 to 0.01%.

The particle size of the pigment may vary within wide limits. In general, the particle size should be small enough to avoid light scattering which is clinically significant for the degree of tint intensity required. An average particle size of $\leq 1$ mm, advantageously $\leq 0.6$ mm, preferably from 0.05 to 0.6 mm and particularly preferred from 0.05 to 0.5 mm has proven as advantageous.

In general, the pigment is provided in form of an aqueous dispersion which comprises the pigment and at least one suitable dispersing agent. Common dispersing agents suitable for this purpose are known to the man skilled in the art of dyes and pigments. In addition, it has surprisingly been found that the water soluble polymer precursor according to a) or any water soluble polymer which is physiologically acceptable may be used as a surfactant in aiding dispersion of the hydrophobic dye particles. Accordingly, it is preferred to use an inventive polymer precursor or a water soluble physiologically acceptable polymer as dispersing agent and omit a further additive. Examples of water soluble physiologically acceptable polymers in addition to the polymer precursor according to a) that may be used as surfactant are polyacrylic acids or polyvinyl alcohols which are devoid of a crosslinkable or polymerizable group, for example those mentioned before as starting materials for the polymer precursor according to a).

The pigment contents of the aqueous pigment dispersion employed according to step b) may vary within wide limits. In general, a pigment contents from about 1 to 70% by weight, preferably 5 to 60% by weight and more preferably 5 to 50% by weight, in each case relative to the weight of the entire dispersion, has proven as valuable. When a water soluble physiologically acceptable polymer, particularly a prepolymer according to a), is used as dispersing agent for the phthalocyanine dye or pigment, said polymer is advantageously present in an amount of 1 to 60 % by weight, preferably 5 to 40% by weight, more preferably 10 to 40% by weight and most preferably 10 to 30% by weight, in each case based the weight of the entire pigment dispersion.

In a preferred embodiment of step b) of the process, a phthalocyanine pigment is provided in form of an aqueous dispersion comprising the pigment and one or more water soluble polymeric dispersing agents selected from the group consisting of a polymer precursor according to a), a polyacrylic acid and a polyvinyl alcohol. More preferably, the phthalocyanine pigment is provided in form of an aqueous dispersion comprising the pigment and one or more water soluble polymeric dispersing agents selected from the group consisting of a polyvinyl alcohol and a polymer precursor according to a) which may be different or, preferably, identical to that employed in step a).

When a water soluble physiologically acceptable polymer, for example a prepolymer according to a), is used as dispersing agent for the pigment in step b), said polymer is preferably purified in advance as described above for the polymer precursor; Accordingly, the dispersion of the pigment according to step b) comprises no, or substantially no, undesired constituents mentioned before that would have to be extracted after the crosslinking operation.

The aqueous pigment dispersion according to step b) is prepared for example by simply admixing water, the pigment and the dispersing agent in a suitable device, for example in a high speed blender, in a roll or ball mill or by use of an ultrasonic probe. In some cases it may me appropriate to filter the pigment dispersion according to step b) or the prepolymerization mixture according to step c) prior to further processing it in order to exclude pigment particles having a particle size that exceeds the aforementioned limits.

(III) PHOTOINITIATORS

In the case of photocrosslinking, it is appropriate to add a crosslinking initiator (preferably a photoinitiator for photocrosslinking) which can initiate crosslinking. The photoinitiator is added for example to the polymer precursor according to step a) or preferably to the prepolymerization mixture according to step c). A reasonable amount of mixing is preferred to distribute the photoinitiator substantially uniformly throughout the polymer precursor solution. Photoinitiators are known to the person having ordinary skill in the art, and include, without limitation thereto, benzoin methyl ether, 1-hydroxycyclohexylphenyl ketone, and DAROCUR® or IRGACUR types, e.g. DAROCUR® 1173 or IRGACUR® 2959, available from Ciba-Geigy Corporation (Ardsley, N.Y.). The crosslinking can then be triggered by actinic radiation, such as, for example, UV light, or ionizing radiation, such as, for example, gamma radiation or X-radiation.

(IV) COMONOMERS

It is preferable to carry out the crosslinking process according to the invention without the addition of a comonomer, for example a vinylic comonomer. However, a vinylic comonomer may be used in addition in the photocrosslinking, and the comonomer may be hydrophilic or hydrophobic or a mixture of a hydrophobic and a hydrophilic vinylic monomer. Suitable vinylic monomers include especially those customarily used in the manufacture of contact lenses. A hydrophilic vinylic monomer denotes a monomer that typically yields as homopolymer a polymer that is water-soluble or can absorb at least 10% by weight of water. Analogously, a hydrophobic vinylic monomer denote, a monomer that typically yields as homopolymer a polymer that is water-insoluble and can absorb less than 10% by weight of water.

Generally, approximately from 0.01 to 80 units of a typical vinylic comonomer react per unit of formula I or III. If a vinylic comonomer is used, the crosslinked polymers according to the invention preferably comprise approximately from I to 15%, especially preferably approximately from 3 to 8%, of units of formula I or III, based on the number of hydroxy groups of the polyvinyl alcohol, which are reacted with approximately from 0.1 to 80 units of the vinylic monomer.

The proportion of the vinylic comonomers, if used, is preferably from 0.5 to 80 units per unit of formula I, especially from 1 to 30 units per unit of formula I, and especially preferably from 5 to 20 units per unit of formula I.

It is also preferable to use a hydrophobic vinylic comonomer or a mixture of a hydrophobic vinylic comonomer with a hydrophilic vinylic comonomer, the mixture comprising at least 50% by weight of a hydrophobic vinylic comonomer. In that manner the mechanical properties of the polymer can be improved without the water content falling substantially. In principle, however, both conventional hydrophobic vinylic comonomers and conventional hydrophilic vinylic comonomers are suitable for the copolymerization with polyvinyl alcohol comprising groups of formula I.

Suitable hydrophobic vinylic comonomers include, without the list being exhaustive, $C_1$–$C_{18}$ alkyl acrylates and methacrylates, $C_3$–$C_{18}$ alkyl acrylamides and methacrylamides, acrylonitrile, methacrylonitrile, vinyl-$C_1$–$C_{18}$ alkanoates, $C_2$–$C_{18}$ alkenes, $C_2$–$C_{18}$ haloalkenes, styrene, $C_1$–$C_6$ alkylstyrene, vinyl alkyl ethers, in which the alkyl moiety contains from 1 to 6 carbon atoms, $C_2$–$C_{10}$ perfluoroalkyl acrylates and methacrylates or correspondingly partially fluorinated acrylates and methacrylates, $C_3$–$C_{12}$ perfluoroalkyl-ethylthiocarbonylaminoethyl acrylates and methacrylates, acryloxy- and methacryloxy-alkylsiloxanes, N-vinylcarbazole, $C_1$–$C_{12}$ alkyl esters of maleic acid, fumaric acid, itaconic acid, mesaconic acid and the like. $C_1$–$C_4$ alkyl esters of vinylically unsaturated carboxylic acids having from 3 to 5 carbon atoms or vinyl esters of carboxylic acids having up to 5 carbon atoms, for example, are preferred.

Examples of suitable hydrophobic vinylic comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris-trimethylsilyloxy-silyl-propyl methacrylate, 3-methacryloxypropylpentamethyldisiloxane and bis(methacryloxypropyl)tetramethyldisiloxane. Preferred hydrophobic vinylic comonomers are methyl methacrylate and vinyl acetate.

Suitable hydrophilic vinylic comonomers include, without the limitation thereto, hydroxy-substituted lower alkyl acrylates and methacrylates, acrylamide, methacrylamide, lower alkyl acrylamides and methacrylamides, ethoxylated acrylates and methacrylates, hydroxy-substituted lower alkyl acrylamides and methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino- (the term "amino" also including quaternary ammonium), mono-lower alkylamino- or di-lower alkylamino-lower alkyl acrylates and methacrylates, allyl alcohol and the like. Hydroxy-substituted C2–C4alkyl(meth)acrylates, five- to seven-membered N-vinyl lactams, N,N-di-C1–C4alkyl(meth)acrylamides and vinylically unsaturated carboxylic acids having a total of from 3 to 5 carbon atoms, for example, are preferred.

Examples of suitable hydrophilic vinylic comonomers include hydroxyethyl methacrylate, hydroxyethyl acrylate, acrylamide, methacrylamide, dimethylacrylamide, allyl alcohol, vinylpyridine, vinylpyrrolidone, glycerol methacrylate, N-(1,1-dimethyl-3-oxobutyl)acrylamide, and the like. Preferred hydrophilic vinylic comonomers are 2-hydroxyethyl methacrylate, N-vinylpyrrolidone and acrylamide.

(V) PREPARATION OF A TINTED PREPOLYMERIZATION MIXTURE AND MANUFACTURE OF A TINTED OPHTHALMIC LENS THEREFROM

According to step c) of the inventive process, a tinted prepolymerization mixture may be formed by admixing suitable amounts mentioned before of a polymer precursor according to a), a pigment according to b) and optionally a photoinitiator and/or one or more comonomers.

In the preferred process of the invention the prepolymerization mixture comprises a photoinitiator but is devoid of an additional vinyl comonomer.

The tinted prepolymerization mixture thus obtained can be processed in a manner known per se to form moldings, especially contact lenses, for example by carrying out the photocrosslinking of the prepolymerization mixture in a suitable contact lens mold.

For the introduction of the tinted prepolymerization mixture of the invention into a mold, processes known per se can be used, such as, especially, conventional metering in, for example by means of dropwise introduction. The liquid mixture which is dispensed into the mold is preferably an aqueous solution. For example, an approximately 15 to 50 weight percent, preferably 15 to 40 weight percent and more preferably 20 to 40% weight percent, aqueous solution can be photocrosslinked. If vinyl comonomers are present, the above-mentioned comonomers in the amounts mentioned there are suitable. Vinyl comonomers that may be present are advantageously first mixed with the polymer precursor of the invention and then introduced into the mold.

Appropriate molds or mold halves may be manufactured from disposable or recyclable polymeric materials (e.g., polypropylene or polystyrene) which transmit radiation of the chosen wavelength sufficient to crosslink or polymerize the polymer precursor. Alternatively, re-usable molds may be manufactured from materials such as quartz, sapphire or metals. When the moldings to be produced are contact lenses, they can be produced in a manner known per se, for example in a conventional "spin-casting mold", as described, for example, in U.S. Pat. No. 3,408,429. However, double-sided molding (DSM) processes, such as described in U.S. Pat. No. 4,347,198, which is incorporated by reference, are preferred. Double-sided molding processes typically utilize a concave (also known as "female" or "front surface") mold half which mates with a convex (also known as "male" or "back surface") mold half. Typically, in the DSM process, liquid monomer or polymer precursor is dispensed into the female mold half, the male mold half is affixed to the female mold half, and light (e.g. ultraviolet) is applied to initiate polymerization or crosslinking and form a solid lens.

The photocrosslinking can be induced in the mold, for example by actinic radiation, e.g. UV light, or ionising radiation, e.g. gamma radiation or X-rays.

As has already been mentioned, the photocrosslinking is advantageously carried out in the presence of a photoinitiator capable of initiating radical crosslinking. The photoinitiator is advantageously added to the prepolymerization mixture of the invention before introduction into the mold, preferably by mixing the prepolymer, the metal phthalocyanine dye or pigment and the photoinitiator together. The amount of photoinitiator can be chosen within wide limits, an amount of up to 0.05 g/g of polymer and especially of up to 0.003 g/g of polymer having proved advantageous.

It is to be emphasized that according to the invention the crosslinking can be effected in a very short time, for example in $\leq 60$ minutes, advantageously in $\leq 20$ minutes, preferably in $\leq 10$ minutes, especially in $\leq 5$ minutes, more especially in $\leq 1$ minute and most especially in $\leq 30$ seconds.

Opening of the mold so that the moulding can be removed from the mold can be carried out in a manner known per se.

A preferred embodiment of the invention relates to a process for the manufacture of tinted contact lenses which comprises the following steps:

(a) providing an aqueous solution of polyvinyl alcohol having polymerizable or crosslinkable groups;

(b) providing an aqueous dispersion containing a phthalocyanine pigment;

(c) mixing the polyvinyl alcohol solution with the pigment dispersion to form a tinted prepolymerization mixture;

(d) introducing the tinted prepolymerization mixture into a mold;

(e) applying radiation to the tinted prepolymerization mixture in the mold, thereby crosslinking or polymerizing the polymer precursor and entrapping the dye or pigment within the polymeric network of the resultant contact lens, and (f) opening the mold so that the tinted contact lens can be removed from the mold.

A more preferred embodiment of the invention relates to a process for the manufacture of tinted contact lenses which comprises the following steps:

(a) providing a 15 to 40 weight percent aqueous solution of a polyvinyl alcohol prepolymer having a weight-average molecular weight of at least about 2000 that, based on the number of hydroxy groups of the polyvinyl alcohol, includes from about 0.5% to about 80% of units of formula I:

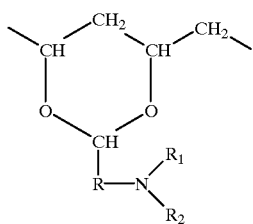

(I)

wherein R is lower alkylene having up to 8 carbon atoms, $R_1$ is hydrogen or lower alkyl, and $R_2$ is an olefinically unsaturated, electron-attracting copolymerizable radical, 15 preferably having up to 25 carbon atoms, preferably an olefinically unsaturated acyl radical of the formula $R_3$—CO—, in which $R_3$ is an olefinically unsaturated copolymerizable radical having from 2 to 24 carbon atoms, preferably from 2 to 8 carbon atoms, especially preferably from 2 to 4 carbon atoms.;

(b) providing an aqueous dispersion comprising 1 to 70% by weight, based on the weight of the entire dispersion, of a copper phthalocyanine pigment and 1 to 60% by weight, based on the weight of the entire dispersion, of a dispersing agent selected from the group consisting of a polyvinyl alcohol prepolymer according to a), a polyacrylic acid and a polyvinyl alcohol;

(c) mixing the prepolymer solution according to a) with the pigment dispersion according to b) to form a tinted prepolymerization mixture;

(d) introducing the tinted prepolymerization mixture into a mold;

(e) applying radiation to the tinted prepolymerization mixture in the mold in a time period of ≦5 minutes, thereby crosslinking or polymerizing the polymer precursor and entrapping the pigment within the polymeric network of the resultant contact lens, and (f) opening the mold so that the tinted contact lens can be removed from the mold.

An even more preferred embodiment of the invention relates to a process for the manufacture of a tinted contact lens which is suitable to be inserted into the human eye without extraction, comprising the following steps:

(a) providing a 20 to 40 weight percent aqueous solution of a polyvinyl alcohol prepolymer having a weight-average molecular weight of at least about 2000 that, based on the number of hydroxy groups of the polyvinyl alcohol, includes from about 0.5% to about 80% of units of

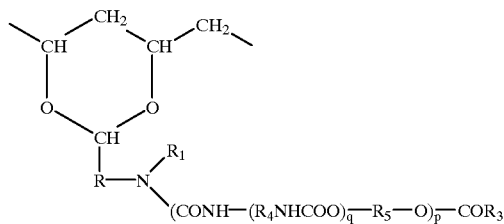

(III)

where R is lower alklene having up to 6 carbon atoms, $R_1$ is hydrogen or alkyl having up to 4 carbon atoms, p is zero, and $R_3$ is alkenyl having from 2 to 8 carbon atoms;

(b) providing an aqueous dispersion comprising 5 to 60% by weight, based on the weight of the entire dispersion, of a copper phthalocyanine pigment and 5 to 40% by weight, based on the weight of the entire dispersion, of a dispersing agent selected from the group consisting of a polyvinyl alcohol prepolymer according to a) and a polyvinyl alcohol;

(c) mixing the prepolymer solution according to a) with the pigment dispersion according to b) and a photoinitiator to form a tinted prepolymerization mixture containing 0.0001 to 0.05 weight percent phthalocyanine pigment, based on the total weight of polymer precursor;

(d) introducing the tinted prepolymerization mixture into a mold;

(e) applying radiation to the prepolymerization mixture in the mold in a time period of c 1 minute, thereby crosslinking or polymerizing the polymer precursor and entrapping the pigment within the polymeric network of the resultant contact lens, and (f) opening the mold so that the tinted contact lens can be removed from the mold.

A further embodiment of the invention relates to tinted ophthalmic moldings, particularly tinted contact lenses that are obtainable according to the process of the invention, wherein the above given definitions and preferences apply.

When the molding produced according to the invention is a contact lens and when the latter has been produced from a prepolymerization mixture comprising previously purified components, then the crosslinked product does not contain any troublesome impurities either. Subsequent extraction is therefore unnecessary. Since the crosslinking is carried out in a substantially aqueous solution, subsequent hydration is also unnecessary. The contact lenses obtainable according to that process are therefore distinguished, according to an advantageous embodiment, by the fact that they are suitable for their designated use without extraction. In this connection, designated use is understood as meaning especially that the contact lenses can be inserted into the human eye.

The contact lenses obtainable according to the invention have a range of unusual and extremely advantageous properties. Of those properties there may be mentioned, for example, their excellent tolerability by the human cornea, which is based on a balance of water content, oxygen permeability and mechanical properties. Moreover, the contact lenses of the invention have a high mechanical strength and particularly exhibit a high degree of dimensional stability. No changes in shape were discernible even after autoclaving at, for example, about 120° C. Generally, the tinted contact lenses are substantially uniformly tinted throughout the body of the lens. The contact lenses of the invention are furthermore bleach-resistant, and, due to a quantitative incorporation of the pigment into the lens matrix, show no leaching or migration of the pigment out of the lens. In addition, the contact lenses are optical clear and transparent and have transmission values % T which are equivalent to those of untinted lenses.

It can also be emphasized that the full-body tinted contact lenses of the invention can be produced in a very simple and efficient manner as compared with the prior art. This is the result of several factors. Firstly, the starting materials are inexpensive to obtain or prepare. Secondly, there is the advantage that the prepolymers are surprisingly stable, so that they can be subjected to a high degree of purification. Accordingly, since it is possible to use for the crosslinking a purified polymer, and furthermore since the pigment is entrapped quantitatively within the polymer matrix during the crosslinking and/or polymerization step, virtually no subsequent purification, such as, especially, the complicated extraction of pigment and/or unpolymerized constituents is required ( e.g. to achieve ophthalmic compatibility or meet regulatory requirements). A further significant advantage of the present methods and compositions is that the pigment does not deactivate during the crosslinking and/or polymerization step. It has been unexpectedly found that pigments, particularly metal phthalocyanine pigments and equivalents thereof, are not subject to any substantial tinting deactivation during the application of ultraviolet radiation to form the solid contact lens. In contrast, quite a large number of dyes are subject to bleaching during the polymerization or molding step of the lens manufacturing process. Moreover, the crosslinking can be carried out in an aqueous solution, so that the subsequent exchange of solvents or the hydration step, respectively, is not required. Finally, the photopolymerization takes place in a short time, so that the process for the production of the contact lenses of the invention can be made extraordinarily economical from that point of view also.

All the advantages mentioned above naturally apply not only to contact lenses but also to other moldings according to the invention. While visibility tinted ophthalmic lenses are the preferred products, the present invention may have utility in the fabrication of a wide variety of translucent or transparent polymeric products, including without limitation thereto, translucent automotive windshields or side glazing; films or membranes such as membranes for diffusion control, photostructurizable films for information storage, or photoresist materials (e.g., membranes or moldings for etch resist or screen printing resist); and plastic eyeglasses or spectacles. Ophthalmic lenses, as used herein, refers to contact lenses (hard or soft), intraocular lenses, eye bandages and artificial corneas. The present invention has particular utility with regard to the fabrication of soft, hydrophilic contact lenses which are full-body tinted so that the consumer can identify the lenses in a lens-retaining container.

The sum of the various advantageous aspects in the production of the moldings of the invention leads to the moldings of the invention being suitable especially as mass-produced articles, for example as contact lenses that are worn for a short period of time and are then replaced by new lenses.

The previous disclosure will enable one having ordinary skill in the art to practice the invention. In order to better enable the reader to understand specific embodiments and the advantages thereof, reference to the following examples is suggested.

EXAMPLE 1

Preparation of polymer precursor functionalizer 220 grams of sodium hydroxide is dissolved in 300 grams water and 700 grams ice in a 3-liter reactor having a stirrer and cooling system. The sodium hydroxide solution is cooled to 10° C. 526 grams of aminoacetaldehyde dimethylacetal and 50 mg of 4-hydroxy-2,2,6,6-tetramethyl-piperidin-1-oxide (a radical inhibitor) are added to the sodium hydroxide solution. 548.6 grams of methacrylic acid chloride are slowly added to the solution at 10° C. over a period of 3.5 hours. The pH value drops slowly to 7.2 when the addition is complete, and amine can no longer be detected by gas chromatography. The mixture is extracted with 500 ml of petroleum ether, and in order to remove impurities, the aqueous phase is saturated with sodium chloride and extracted three times with 500 ml of tert-butyl methyl ether. The organic phase is dried with magnesium sulfate, filtered and concentrated using a rotary evaporator. The resulting 882.2 g. of yellowish oil are slowly stirred into 2000 ml of petroleum ether at -10° C by means of an Ultraurax. The product crystallizes, and is isolated by filtration and dried. 713.8 grams of methacrylamidoacetaldehyde dimethylacetal, having a melting point of 30–32° C. are obtained. The product is 99.7% pure according to gas chromatography.

EXAMPLE 2

Preparation of crosslinkable polymer precursor 300 grams of Mowiol 3-83 (polyvinyl alcohol from Hoechst) are placed in a 2-liter double-jacket 20 reactor having a stirrer and thermometer. 800 grams of deionized water are added to the reactor, and the aqueous mixture is heated to 95° C. with stirring. After about an hour, a clear solution of PVA is produced. The solution is cooled to 20° C.

27 g. of methacrylamidoacetaldehyde dimethyl acetal functionalizer (from Example 1), 440 g. of acetic acid, 100 g. of concentrated hydrochloric acid (37%) and 333 g. of deionized water are mixed to produce a 2000 g. reaction solution. The mixture is stirred for 20 hours at 20° C. to produce a crosslinkable polyvinyl alcohol. The change in acetate content can be ascertained by titration with acetic acid.

EXAMPLE 3

Purification of crosslinkable polymer precursor

The crosslinkable PVA solution from Example 2 is dialyzed by means of ultrafiltration. The ultrafiltration is accomplished by using a 1-KD-Omega membrane produced by Filtron. Ultrafiltration is continued until a residue sodium chloride content of 0.004% is achieved. Concentration of the dialysed solution yields 942 grams of a 30% crosslinkable PVA solution with N-content of 0.672% (by Kjendahl determination), acetate content of 1.516 meg/g. (by hydrolysis), dynamic viscosity of 2000 mpas, double bonds of 0.480 meq/g. (by microhydrogenation), free hydroxyl groups of 17.74 meq/g (by reacetylation), molecular weights of Mw=26200 and Mn=12300 (by size exclusion chromatography in water).

EXAMPLE 4

Preparation of a pigment dispersion

An aqueous dispersion is prepared by adding with stirring 0.97 g of purified copper phthalocyanine pigment (Unisphere Blue G-PI, average particle size 433 nm) to a solution of 1.55 g Moviol 3-83 and 3.97 ml of distilled water.

0.65 g of the pigment dispersion obtained above is diluted by adding with stirring 205.0 g of the crosslinkable PVA solution according to Example 3. The pigment contents of the resulting dispersion is 0.047% by weight relative to the entire dispersion.

EXAMPLE5

Preparation of a tinted prepolymerization mixture 17.5 g of the diluted pigment dispersion according to Example 4 is added to 191.5 g of the purified solution of the polymer precursor according to Example 3. After the addition of about 0.2 grams of photoinitiator (Irgacuree®2959) the resultant formulation is mixed for about one hour and is then filtered over a 0.45 mm filter. The pigment contents of the resulting tinted prepolymerization mixture is 39.6 ppm relative to the entire formulation.

EXAMPLE6

Formation of tinted contact lens

About 0.025 ml of the tinted prepolymerization mixture from Example 5 is dispensed into a female mold half of a double-sided contact lens mold. The male mold half is then releasably affixed to the female mold half. Ultraviolet radiation is applied at an intensity of about 2.5 mW/cm$^2$ for a period of about 14 seconds. The mold halves are separated and the lens is removed. The lens is uniformly tinted throughout the body and has a visible light transmission of about 96%.

The invention has been described in detail, with reference to certain preferred embodiments, in order to enable the reader to practice the invention without undue experimentation. However, a person having ordinary skill in the art will readily recognize that many of the components and parameters may be varied or modified to a certain extent without departing from the scope and spirit of the invention. Furthermore, titles, headings, definitions or the like are provided to enhance the reader's comprehension of this document, and should not be read as limiting the scope of the present invention. Accordingly, the intellectual property rights to this invention are defined only by the following claims and reasonable extensions and equivalents thereof.

What is claimed is:

1. A process for the manufacture of a tinted ophthalmic molding comprising the steps of:
    (a) providing a water soluble polymer having crosslinkable groups and having a weight average molecular weight of at least 2000;
    (b) providing an aqueous pigment dispersion comprising a phthalocyanine pigment and a physiologically acceptable, water soluble, polymeric dispersing agent;
    (c) mixing the pigment dispersion with the polymer to form a tinted prepolymerization mixture,
    (d) dispensing the tinted prepolymerization mixture into a mold,
    (e) applying radiation to the tinted prepolymerization mixture in the mold, thereby crosslinking or polymerizing the polymer and entrapping the pigment within the polymeric network of the resultant ophthalmic molding, and
    (f) opening the mold so that the ophthalmic molding can be removed from the mold.

2. A process according to claim 1, wherein the ophthalmic molding is a contact lens.

3. A process according to claim 1, wherein the water soluble polymer is a polyvinyl alcohol having a weight-average molecular weight of at least about 2000 that, based on the number of hydroxy groups of the polyvinyl alcohol, include from about 0.5% to about 80% of units of formula I:

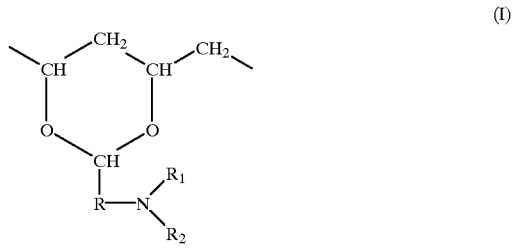

wherein:
    R is lower alkylene having up to 8 carbon atoms, $R_1$ is hydrogen or lower alkyl, and $R_2$ is an olefinically unsaturated, electron-attracting copolymerizable radical.

4. A process according to claim 1, wherein the water soluble polymer is a polyvinyl alcohol having a weight average molecular weight of at least about 2000 that, based on the a number of hydroxyl groups of the polyvinyl alcohol, includes from about 0.5% to about 80% of units of formula III:

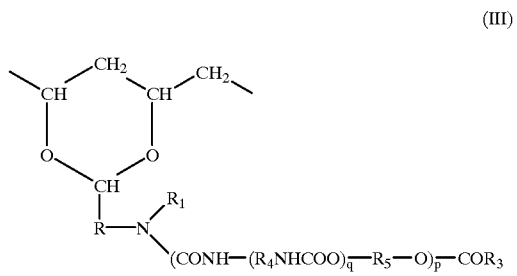

where R is lower alkylene, $R_1$ is hydrogen or lower alkyl, p is zero or one, q is zero or one, $R_3$ is an olefinically unsaturated copolymerizable radical having from 2 to 8 carbon atoms, and $R_4$ and $R_5$ are each, independently of the other, lower alkylene having from 2 to 8 carbon atoms, arylene having from 6 to 12 carbon atoms, a saturated divalent cycloaliphatic group having from 7 to 14 or arylenealkylenearylene having from 13 to 16 carbon atoms.

5. A process according to claim 4, wherein R is lower alkylene having up to 6 carbon atoms, p is zero and $R_3$ is alkenyl having from 2 to 8 carbon atoms.

6. A process according to claim 1, wherein the water soluble polymer according to step a) is provided in form of a 15 to 50 weight percent aqueous solution.

7. A process according to claim 1, wherein the pigment dispersion according to step b) is an aqueous dispersion comprising the pigment and a water soluble polymeric dispersing agent selected from the group consisting of a polymer according to a), a polyacrylic acid and a polyvinyl alcohol.

8. A process according to claim 1, wherein the pigment according to step b) is an aqueous dispersion selected from the group consisting of a polymer according to a) and a polyvinyl alcohol.

9. A process according to claim 8, wherein the aqueous dispersion comprises 1 to 70% by weight of pigment and 1 to 60% by weight of polymer, in each case relative to the weight of the entire dispersion.

10. A process according to claim 1, wherein the weight percentage of pigment, based on the total weight of polymer and optional comonomers present in the prepolymerization mixture according to c), is from about 0.0001 to 0.05%.

11. A process according to claim 1, wherein a photoinitiator is added to the prepolymerization mixture according to step c).

12. A process according to claim 1, wherein the prepolymerization mixture according to step c) is devoid of a comonomer.

13. A process according to claim 1, wherein the crosslinking and/or polymerizing of the polymer and the entrapping of the pigment according to step e) occurs in a period of $\leq 5$ minutes.

14. A process according to claim 1 for the manufacture of a tinted contact lens which comprises the following steps:
(a) providing an aqueous solution of polyvinyl alcohol having polymerizable or crosslinkable groups;
(b) providing an aqueous dispersion containing a copper phthalocyanine pigment;
(c) mixing the polyvinyl alcohol solution with pigment dispersion to form a tinted prepolymerization mixture;
(d) introducing the tinted prepolymerization mixture into a mold;
(e) applying radiation to the tinted prepolymerization mixture in the mold, thereby crosslinking or polymerizing the polymer precursor and entrapping the pigment within the polymeric network of the resultant contact lens, and
(f) opening the mold so that the tinted contact lens can be removed from the mold.

15. A process according to claim 1 for the manufacture of a tinted contact lens which comprises the following steps:
(a) providing a 15 to 40 weight percent aqueous solution of a polyvinyl alcohol prepolymer having a weight-average molecular weight of at least about 2000 that, based on the number of hydroxy groups of the polyvinyl alcohol, includes from about 0.5% to about 80% of units of formula I:

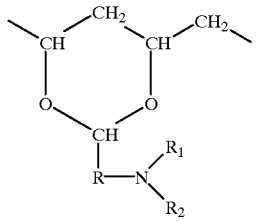

(I)

wherein R is lower alkylene having up to 8 carbon atoms, $R_1$ is hydrogen or lower alkyl, and $R_2$ is an olefinically unsaturated, electron-attracting copolymerizable radical;
(b) providing an aqueous dispersion comprising 1 to 70% by weight, based on the weight of the entire dispersion, of a copper phthalocyanine pigment and 1 to 60% by weight, based on the weight of the entire dispersion, of a dispersing agent selected from the group consisting of a polyvinyl alcohol prepolymer according to a), a polyacrylic acid and a polyvinyl alcohol;
(c) mixing the prepolymer solution according to (a) with the pigment dispersion according to (b) to form a tinted prepolymerization mixture;

(d) introducing the tinted prepolymerization mixture into a mold;
(e) applying radiation to the prepolymerization mixture in the mold in a time period of $\leq 5$ minutes, thereby crosslinking or polymerizing the polymer precursor and entrapping the pigment within the polymeric network of the resultant contact lens, and
(f) opening the mold so that the tinted contact lens can be removed from the mold.

16. A process according to claim 1 for the manufacture of a tinted contact lens which is suitable to be inserted into the human eye without extraction, comprising the following steps:
(a) providing a 20 to 40 weight percent aqueous solution of a polyvinyl alcohol prepolymer having a weight-average molecular weight of at least about 2000 that, based on the number of hydroxy groups of the polyvinyl alcohol, includes from about 0.5% to about 80% of units of formula III:

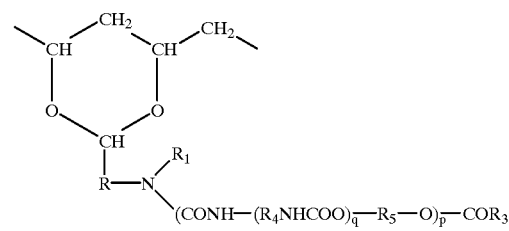

where R is lower alkylene having up to 6 carbon atoms, $R_1$ is hydrogen or alkyl having up to 4 carbon atoms, p is zero, and $R_3$ is alkenyl having from 2 to 8 carbon atoms;
(b) providing an aqueous dispersion comprising 5 to 60% by weight, based on the weight of the entire dispersion, of a copper phthalocyanine pigment and 1 0 to 40% by weight, based on the weight of the entire-dispersion, of a dispersing agent selected from the group consisting of a polyvinyl alcohol prepolymer according to a) and a polyvinyl alcohol;
(c) mixing the prepolymer solution according to a) with the pigment dispersion according to b) and an additional photoinitiator to form a tinted prepolymerization mixture containing 0.0001 to 0.05 weight percent phthalocyanine pigment, based on the total weight of polymer precursor;
(d) introducing the tinted prepolymerization mixture into a mold;
(e) applying radiation to the tinted prepolymerization mixture in the mold in a time period of $\leq 1$ minute, thereby crosslinking or polymerizing the polymer precursor and entrapping the pigment within the polymeric network of the resultant contact lens, and
(f) opening the mold so that the tinted contact lens can be removed from the mold.

17. An ophthalmic molding which is formed by a process according to claim 1.

18. A tinted contact lens which is formed by a process according to claim 14.

19. A tinted contact lens which is formed by a process according to claim 15.

20. A tinted contact lens which is formed by a process according to claim 16.

21. A process for the manufacture of a tinted ophthalmic molding comprising the steps of:

(a) providing a water soluble polymer having crosslinkable groups and having a weight average molecular weight of at least 2000;

(b) providing an aqueous pigment dispersion comprising a phthalocyanine pigment and a dispersing agent;

(c) mixing the pigment dispersion with the polymer to form a tinted prepolymerization mixture, (d) dispensing the tinted prepolymerization mixture into a mold, (e) applying radiation to the tinted prepolymerization mixture in the mold, thereby crosslinking or polymerizing the polymer and entrapping the pigment within the polymeric network of the resultant ophthalmic molding, and (f) opening the mold so that the ophthalmic molding can be removed from the mold;

wherein the dispersing agent is selected from the group consisting of the polymer according to a), polyacrylic acid, and polyvinyl alcohol.

22. A process for the manufacture of a tinted ophthalmic molding comprising the steps of:

(a) providing a water soluble polymer having crosslinkable groups and having a weight average molecular weight of at least 2000;

(b) providing an aqueous pigment dispersion comprising a phthalocyanine pigment and a dispersing agent;

(c) mixing the pigment dispersion with the polymer to form a tinted prepolymerization mixture, (d) dispensing the tinted prepolymerization mixture into a mold, (e) applying radiation to the tinted prepolymerization mixture in the mold, thereby crosslinking or polymerizing the polymer and entrapping the pigment within the polymeric network of the resultant ophthalmic molding, and (f) opening the mold so that the ophthalmic molding can be removed from the mold;

wherein the crosslinking is not followed by extraction in order to remove undesired constituents.

23. A process for the manufacture of a tinted ophthalmic molding comprising the steps of:

(a) providing a water soluble polymer having crosslinkable groups and having a weight average molecular weight of at least 2000;

(b) providing an aqueous pigment dispersion comprising a phthalocyanine pigment and a dispersing agent;

(c) mixing the pigment dispersion with the polymer to form a tinted prepolymerization mixture, (d) dispensing the tinted prepolymerization mixture into a mold, (e) applying radiation to the tinted prepolymerization mixture in the mold, thereby crosslinking or polymerizing the polymer and entrapping the pigment within the polymeric network of the resultant ophthalmic molding, and (f) opening the mold so that the ophthalmic molding can be removed from the mold;

wherein said ophthalmic molding is suitable for insertion into a human eye without extraction.

* * * * *